Aug. 25, 1931.  F. H. FUNCHESS  1,820,792
REGROOVING TOOL
Filed March 12, 1930
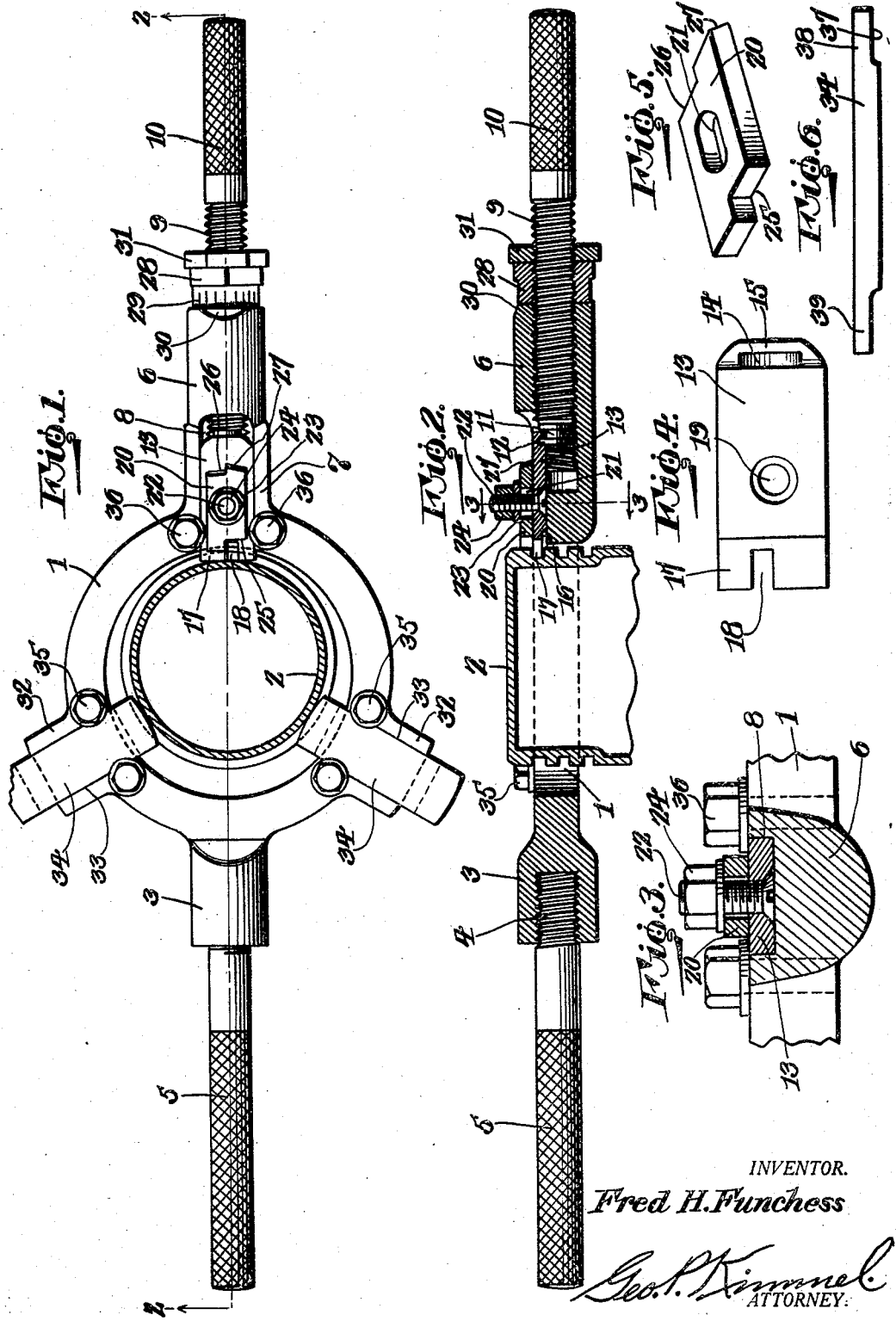
INVENTOR.
*Fred H. Funchess*
*Geo. P. Kimmel*
ATTORNEY.

Patented Aug. 25, 1931

1,820,792

UNITED STATES PATENT OFFICE

FRED H. FUNCHESS, OF HANFORD, CALIFORNIA, ASSIGNOR TO BUDLONG & FUNCHESS MOTOR PRODUCTS CO., OF HANFORD, CALIFORNIA, A FIRM

REGROOVING TOOL

Application filed March 12, 1930. Serial No. 435,353.

This invention relates to a regrooving tool for deepening or cleaning the grooves of a piston, and has for its primary object to provide, in a manner as hereinafter set forth, a tool of such class which may be applied to a piston without removing the connecting rod therefrom.

A further object of the invention is to provide a tool of the character aforesaid by means of which the ring land below the piston groove to which the tool is being applied may be relieved or chamfered simultaneously with the deepening of the groove.

A further object of the invention is to provide a tool of the character aforesaid which employs interchangeable cutters of varying sizes in order that the tool may be applied to grooves of different sizes, the cutters being adjustable radially of the piston, in order that a groove of any size may be cut to any depth desired.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is a top plan of my improved tool in operative position with respect to a piston shown in section.

Figure 2 is a section taken on the line 2—2 of Figure 1.

Figure 3 is a section taken on the line 3—3 of Figure 2.

Figure 4 is a bottom plan of the groove cutter.

Figure 5 is a perspective view of the land cutter.

Figure 6 is an elevation of one of the guides.

Referring to the drawings in detail, the numeral 1 designates the annular body portion of a stock, such body portion being adapted to encircle a piston such as 2. Formed integrally with the body portion 1 is a laterally projecting, enlarged cylindrical boss 3, the outer portion of which is hollow and interiorly threaded for engagement with an externally threaded end portion 4 of a handle member 5. Diametrically opposite the boss 3, the body portion 1 is formed with a boss 6 which is of materially greater length than the boss 3, and the outer portion of which is hollow and provided with internal threads. The upper face of the boss 6 is formed with a cut away portion 7 which extends from a point substantially midway the ends of the boss to the inner end thereof, the upper edge of the cut away portion 7 being flush with the upper face of the body portion 1. The cut away portion 7 is formed with a recess 8 which opens through the wall of the hollow portion of the boss and which extends inwardly through the upper face of the body portion 1. Engaging the internal threads of the boss 6 is a feed screw 9, the outer end portion of which is formed with a handle member 10. The threads of the screw 9 terminate in spaced relation to the inner end of the screw, and the smooth inner end portion of the screw is formed with a circumferentially extending groove 11 whereby a bead 12 is formed at the extreme inner end of the screw.

Slidably mounted within the recess 8 is a cutter 13 which is formed in its lower face with an arcuate, transversely extending recess 14. The recess 14 is arranged in spaced relation to the outer end of the cutter thereby providing a rib 15 at the extreme outer end of the cutter. The bead 12 on the screw 9 is adapted to extend into the recess 14, while the rib 15 on the cutter is adapted to extend into the groove 11 in the feed screw. At the forward end thereof, the cutter 13 is formed in its lower face with a recess 16 thereby providing the cutter 13 with an inner end portion 17 of materially reduced thickness and in spaced relation to the bottom wall of the recess 8. The reduced end portion 17 is formed with an elongated slot 18 which opens through the inner end face of the portion 17. Intermediate the ends thereof the cutter 13 is formed with a circular opening 19.

Seated on the cutter 13 is an auxiliary cutter 20 which is formed centrally thereof with an elongated opening 21 in registry with the opening 19. Extending through the openings 19 and 21 is a bolt 22, the head of which is countersunk in the lower face of the cutter 13. The cutter 20 is maintained in position with respect to the cutter 13 by means of a washer 23 and a nut 24. At the forward end thereof the auxiliary cutter 20 is formed with a notch 25 which extends from one side edge of the cutter to a point substantially midway between the side edges thereof. At the rearward end thereof the cutter 20 is formed with a notch 26 which extends from one side edge of the cutter to a point substantially midway between the side edges thereof. The notches 25 and 26 are extended from opposite side edges of the cutter. The portion of the cutter 20 which extends rearwardly beyond the notch 26 is formed with a bevelled end face indicated at 27.

Threaded on the feed screw 9, between the handle 10 and boss 6, is an adjusting nut 28 which is provided with a circumferentially extending row of calibrations 29. At the rearward end thereof, the boss 6 is formed in its upper face with a cut away portion 30 which inclines outwardly and downwardly and terminates at its outer end with the central portion thereof flush with the calibrated portion of the adjusting nut 28. Threaded on the feed screw 9 between the handle 10 and adjusting nut 28 is a lock nut 31.

Formed on the body portion 1 are a pair of outward and radial projections 32 which are spaced an equal distance from the boss 6 and from each other. The projections 32 are formed in their upper faces with recesses 33 which extend throughout the length of the projections and through the upper face of the body portion 1. Disposed within each recess 33 is a guide 34 which is maintained in position by means of a pair of flanged nuts 35, the stems of which are threaded through the body portion 1. A similar pair of nuts 36 secures the cutter 13 in position within the recess 8. At each end thereof, each of the guides 34 is formed in its lower face with a recess 37, such recesses preferably being of different depths in order that the extreme end portions 38 and 39 of the guides may be of different thicknesses. The guides 34 are reversible within the recesses 33 in order that the end portion of the guide of the desired thickness may be positioned inwardly for engagement with the piston groove to which the tool is being applied.

In the operation of my regrooving tool, the body portion 1 is placed around a piston with the guides 34 and cutter 13 engaging the skirt thereof, and the nuts 35 are tightened to prevent longitudinal movement of the guides 34. The adjusting nut 28 is then moved into engagement with the outer end of the boss 6, and backed off from the boss the required number of calibrations representing the desired depth of the groove in the piston. The lock nut 31 is then tightened against the adjusting nut 28 and the body portion 1 is moved longitudinally of the piston to bring the guides 34 within the groove which it is desired to deepen. The handle 10 is then rotated to bring the cutter 13 into engagement with the inner wall of the groove, and the auxiliary or land cutter 20 is adjusted to bring the inner end thereof into engagement with the ring land directly above the groove. The stock is then rotated in a clock-wise direction while the cutter 13 is fed inwardly by rotating the handle member 10. If it is desired to chamfer the ring land, the tool is inverted and the land cutter 20 is reversed end for end in order to bring the bevelled edge 27 in engagement with the ring land. With the land cutter 20 in this position, the ring land will be chamfered by the cutting edge 27 simultaneously with the deepening of the grooves by the cutter 13. When the cutter 13 has been moved inwardly a sufficient distance to bring the adjusting nut 28 into engagement with the outer end of the boss 6, any further inward movement of the cutter is prevented, thereby assuring the proper depth of the groove.

It is thought that the many advantages of a regrooving tool in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A regrooving tool comprising, a rotatable, annular member adapted to encircle a piston, a boss projecting laterally from the annular member and having a hollow, internally threaded outer end portion, a handle for the annular member, said handle being formed with a feed screw in engagement with the threaded portion of the boss, said boss having a cut away portion at its inner end formed with a recess opening through the wall of the hollow portion of the boss at the inner end of said hollow portion, a groove cutter slidably mounted in said recess and having its outer end connected with the feed screw to move longitudinally therewith, and a land cutter adjustably mounted on the groove cutter, said groove cutter and land cutter operating simultaneously upon the rotation of the annular member.

2. A regrooving tool comprising, a rotatable, annular member adapted to encircle a piston, a boss projecting laterally from the annular member and having a hollow, internally threaded outer end portion, a handle member for the annular member, said handle being formed with a feed screw in engagement with the threaded portion of the boss, said feed screw having a bead at its inner end and further having a groove disposed between said bead and the threads of the screw, said boss having a cut away portion at its inner end formed with a recess opening through the wall of the inner end of the hollow portion, and a groove cutter slidably mounted in said recess, said groove cutter and land cutter operating simultaneously upon the rotation of the annular member, said groove cutter having its lower face formed with an arcuate recess for engagement with the bead at the inner end of the screw and further formed with a rib for engagement with the groove adjacent the bead on the screw.

3. A regrooving tool comprising, a rotatable, annular member adapted to encircle a piston, a boss projecting laterally from the annular member and having a hollow, internally threaded outer end portion, a handle for the annular member, said handle being formed with a feed screw in engagement with the threaded portion of the boss, said boss having a cut away portion at its inner end formed with a recess opening through the wall of the hollow portion of the boss at the inner end of said hollow portion, a groove cutter slidably mounted in said recess and having its outer end connected with the feed screw to move longitudinally therewith, a land cutter adjustably mounted on the groove cutter, a pair of bosses projecting from the annular member, said pair of bosses being spaced an equal distance from the first named boss and from each other, and an elongated guide within each boss of said pair for engagement with the groove of a piston, said guides being adjustable radially of the annular member.

In testimony whereof, I affix my signature hereto.

FRED H. FUNCHESS.